US012227027B2

(12) United States Patent
Re

(10) Patent No.: US 12,227,027 B2
(45) Date of Patent: Feb. 18, 2025

(54) HIGH-DRAINAGE WHEEL HUB UNIT

(71) Applicant: AKTIEBOLAGET SKF, Gothenburg (SE)

(72) Inventor: Paolo A Re, Nichelino (IT)

(73) Assignee: AKTIEBOLAGET SKF (SE)

( * ) Notice: Subject to any disclaimer, the term of this patent is extended or adjusted under 35 U.S.C. 154(b) by 603 days.

(21) Appl. No.: 17/475,532

(22) Filed: Sep. 15, 2021

(65) Prior Publication Data

US 2022/0088963 A1     Mar. 24, 2022

(30) Foreign Application Priority Data

Sep. 23, 2020    (IT) .................. 102020000022306

(51) Int. Cl.
*B60B 27/00*     (2006.01)
*B60B 27/02*     (2006.01)

(52) U.S. Cl.
CPC .......... *B60B 27/0073* (2013.01); *B60B 27/02* (2013.01); *B60B 2900/211* (2013.01)

(58) Field of Classification Search
CPC ............... B60B 27/0073; B60B 27/02; B60B 2900/211
See application file for complete search history.

(56) References Cited

U.S. PATENT DOCUMENTS

| | | | |
|---|---|---|---|
| 8,303,190 B2 | 11/2012 | Shigeoka | |
| 11,585,381 B2* | 2/2023 | Re ................. | F16C 33/7886 |
| 11,633,980 B2* | 4/2023 | Re ................. | F16C 33/7823 |
| | | | 384/480 |
| 2012/0177315 A1 | 7/2012 | Matsuki et al. | |
| 2013/0243360 A1* | 9/2013 | Takimoto .......... | F16C 33/7886 |
| | | | 384/486 |

(Continued)

FOREIGN PATENT DOCUMENTS

| | | |
|---|---|---|
| EP | 2837507 | 2/2015 |
| JP | 2011226620 | 11/2011 |
| JP | 2017106604 | 6/2017 |

OTHER PUBLICATIONS

Machine Translation of JP 2011226620 A (Year: 2011).*
Search Report for corresponding Italian Patent Application No. 102020000022306 dated May 26, 2021.

*Primary Examiner* — S. Joseph Morano
*Assistant Examiner* — Emily G. Castonguay
(74) *Attorney, Agent, or Firm* — Reed Smith LLP

(57) ABSTRACT

A wheel hub unit provided with a radially outer ring, which is stationary during use; a radially inner ring, which is rotating during use; at least one row of rolling elements interposed between the radially outer ring and the radially inner ring; and a sealing assembly, which is interposed between the radially outer ring and the radially inner ring. The sealing assembly defines, cooperating with the radially outer ring or with the radially inner ring, a shield of at least one labyrinth seal. The labyrinth seal does not have a circumferential symmetry, but comprises an upper portion and a lower portion with respect to an axis of symmetry (A) of the wheel hub unit and is provided with an angular interruption of the shield formed on its lower portion corresponding to the lower side of the wheel hub unit so as to increase an outflow section thereof from the said labyrinth seal. Thereby, facilitating gravity drainage of contaminants present inside the sealing assembly.

12 Claims, 3 Drawing Sheets

(56) References Cited

U.S. PATENT DOCUMENTS

| | | | | |
|---|---|---|---|---|
| 2013/0292995 A1* | 11/2013 | Bosco | ............... | F16C 33/805 |
| | | | | 301/6.8 |
| 2015/0003766 A1* | 1/2015 | Duch | ............. | B60B 27/0073 |
| | | | | 384/480 |
| 2017/0198749 A1* | 7/2017 | Seo | ................. | B60B 27/0094 |
| 2021/0164519 A1* | 6/2021 | Niebling | ............ | F16J 15/447 |

* cited by examiner

HIGH-DRAINAGE WHEEL HUB UNIT

PRIORITY AND CROSS-REFERENCE OF RELATED APPLICATIONS

This application is based on and claims priority to Italian Patent Application No. 102020000022306 filed on Sep. 23, 2020, under 35 U.S.C. § 119, the entire disclosure of which is incorporated herein by reference.

TECHNICAL FIELD

The present application generally relates to a high-drainage vehicle wheel hub unit.

BACKGROUND

Certain sealing assemblies intended to equip the rolling bearings of wheel hub units on the so-called "outer" or "outboard" flange side, which supports the wheel, are described in, for example, U.S. Pat. No. 8,303,190 and in U.S. Publication 2012/0177315. Such wheel hub units are formed by so-called "box" seals including a first and second annular screen. The first and second annular screen generally include an L-shaped radial section and are mounted facing each other so as to delimit between the screens an annular chamber inside, which a series of sealing lips are arranged. The sealing lips are mounted on a fixed annular gasket integral with one of the screens, generally the screen intended to remain stationary during use. Access to this annular chamber by the external contaminants (e.g., water, sludge, dust) is limited by a particular configuration of the flange portions of one or both the screens, which also cooperate, in a very close arrangement, with radially outer portions of the outer or inner ring of the bearing and/or of wheel hub elements integral therewith, forming labyrinth seals.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

In certain embodiments disclosed herein, a wheel hub unit performs high drainage in a region of a sealing assembly which equips rolling bearings of a wheel hub unit.

Figure 1:
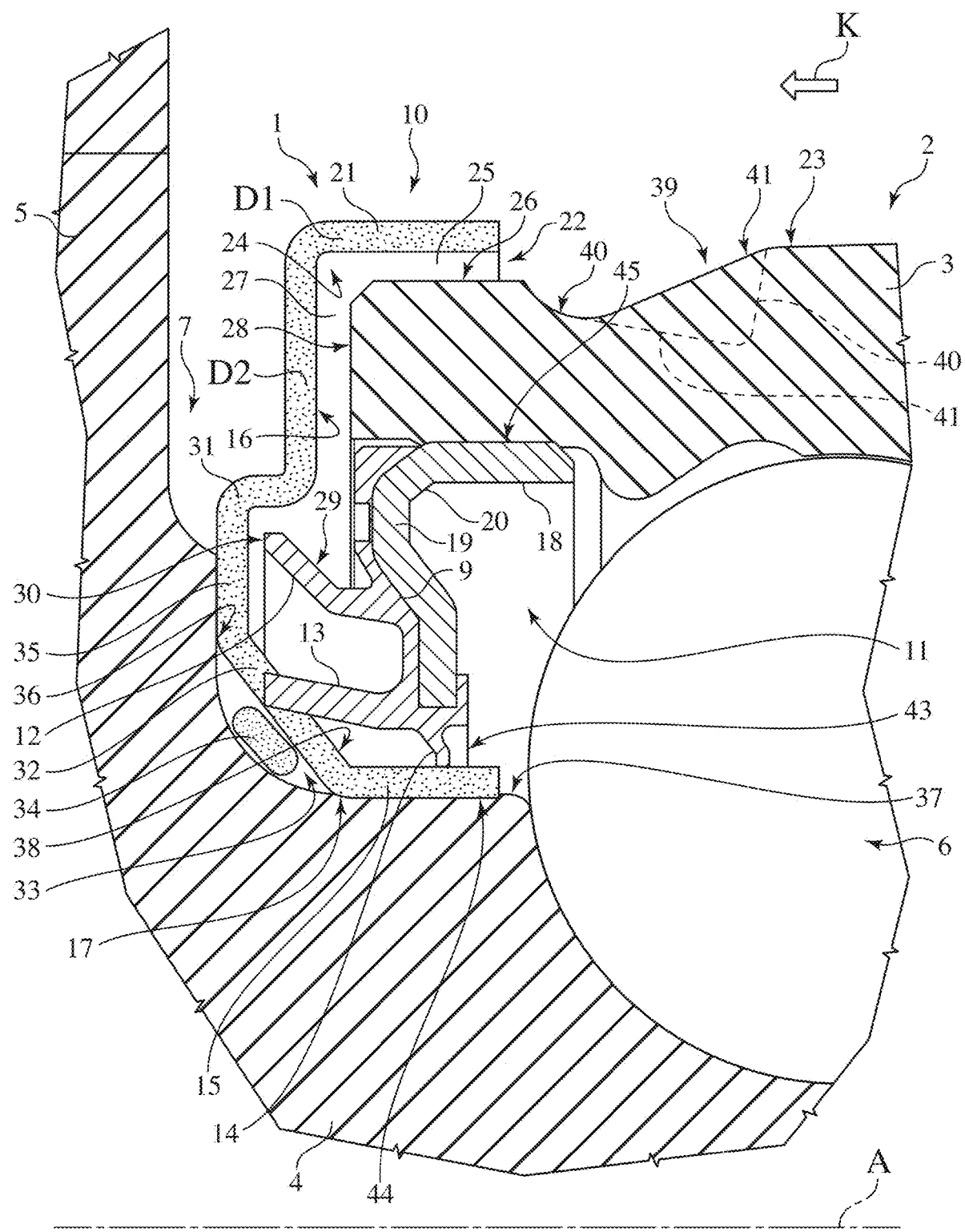
FIG. 1 shows, in schematic form and radially sectioned, a sealing assembly applied to a wheel hub unit.

Improved sealing assemblies have been made where the friction caused due to the high interference of the lips, which make sliding contact, has been reduced. An exemplary labrynthine seal is shown in FIG. 1, which ensures a sealing action against contaminants without the need for high interference of the sliding-contact lips.

However, it has been determined that these solutions pose problems associated with the drainage of sludge and contaminants. In operating conditions, labyrinth seals are in any case subject to the flow of sludge, which normally seeps in from above and from the sides. The sealing assembly is designed to prevent the sludge entering into the first chamber of the labyrinth. However, it has been discovered that, because such a sealing system is axially symmetric, drainage of the lower side may be insufficient to allow the sludge to exit the chamber. Consequently, the sludge remains trapped, resulting in unsatisfactory operation of the sealing assembly.

One solution to this problem is to use bigger "gaps" in the labyrinth seals, for example, designing one of the elements that forms the labyrinth seal with a bend having a greater radius of curvature and with an inclination. In this way the drainage on the bottom side of the wheel hub unit is improved; however, in this way the volume of the containing chamber of the labyrinth seal over 360 degrees is reduced, and consequently the sealing assembly fills up more easily with sludge.

Therefore, there exists a need to define a wheel hub unit that may use a low-friction sealing assembly, such as that described above, and which is provided with characteristics that allow high drainage of the sludge and generally of the contaminants without negatively affecting the containing capacity of the said sealing assembly.

With reference to FIG. 1, a low-friction sealing assembly 1, in particular designed to be mounted on a wheel hub unit 2 of a vehicle, the sealing assembly 1 thereof during use forming an integral part of the wheel hub unit 2. The description of this solution which, as mentioned, is known is intended to help better understand the example embodiments disclosed herein.

An exemplary wheel hub unit 2 comprises an outer ring 3, which is stationary during use, an inner ring 4, which during use rotates about an axis A, which is also the axis of symmetry of both the rings 3 and 4, and at least one row of rolling elements 6 interposed between the outer ring 3 and the inner ring 4, which are coaxial to each other. The ring 4 has a flanged end 5 opposite to the outer ring 3 and intended to carry a vehicle wheel.

An exemplary sealing assembly 1 can be inserted inside an annular interspace 7 delimited between the rotating inner ring 4 and the stationary outer ring 3 of the wheel hub 2 and, more generally, between the rotating element 4 and the stationary element 3, which are coaxial with each other, of a generic rolling bearing of any known type forming part of, or integrated with, the wheel hub unit 2.

The sealing assembly 1 is interposed between the rings 3 and 4, inserted inside the annular space 7, so as to protect the rolling elements 6 arranged between the stationary element 3 and the rotating element 4. The sealing assembly 1 comprises: a first annular screen 10 formed by means of shearing and pressing of stainless-steel metal sheet, a second annular screen 11 also formed by means of shearing and pressing of a stainless steel metal sheet, arranged facing the screen 10, and an annular gasket 9 made of one or more elastomeric materials. The annular gasket 9 is mounted integrally on the screen 11 and provided with a plurality of sealing lips 12, 13, 14, which cooperate, as will be seen, with the screen 10 so as to seal off in a fluid-tight manner the annular interspace 7 from the rolling elements 6.

The screen 10 is provided with a first sleeve-like or more generally cylindrical portion 15, which during use is integral with the rotating element 4 and a first flange portion 16. The first flange portion 16 extends radially projecting from the sleeve portion 15 on the opposite side to the axis A, and therefore radially outwards, from one end 17 of the sleeve portion 15 facing the flange portion 16.

The screen 11 is provided with a second sleeve-like or more generally cylindrical portion 18 and a second flange portion 19. During use, the cylindrical portion 18 is integral with the stationary element 3. The second flange portion 19 is mounted projecting from the sleeve portion 15 radially on the opposite side to the flange portion 16 and situated facing it. The second flange portion 19 therefore extends radially inwards, towards the axis A and towards the sleeve portion 15, from an axial end 20 of the sleeve portion 15 directed, in the non-limiting example of embodiment shown, towards the screen 10 and the flanged end 5.

The lips 12 and 13 of the annular gasket 9 extend axially and radially projecting from the second flange portion 19 towards the first flange portion 16, obliquely with respect to the second flange portion 19, in a direction away from the axis A. Moreover, the first flange portion 16 terminates on the opposite side to the sleeve portion 15, with its radially outer peripheral annular section 21 which, during use, extends radially and axially projecting outside of the annular space 7 so as to define a first labyrinth seal 22 with the stationary element 3.

In this case, the first flange portion 16 extends in the radial direction outside of the annular space 7, radially projecting with respect to a radially outer side surface 23 of the ring 3.

Its terminal peripheral annular section 21 is defined/formed by an edge of the flange portion 16, bent at right angles and defining, in radial cross-section, with the remainder of the flange portion 16 an L facing the axis A.

This right-angled bent edge 21 delimits, during use, in radial cross-section, together with the first flange portion 16 and the stationary element 3, an L-shaped channel 24 having, according to the main aspect of the example embodiment, a substantially constant, but not necessarily identical width in the radial and axial direction.

The L-shaped channel 24 comprises a first branch 25, which forms the labyrinth seal 22, and which is delimited between the annular section or right-angled bent edge 21 of the first flange portion 16, and a first cylindrical section 26 of the side surface 23 of the outer ring 3, and a second branch 27, which is arranged at right angles with respect to the branch 25 and is delimited between the first flange portion 16 and a flat front surface 28 of the stationary element or outer ring 3 facing the rotating element or inner ring 4.

The L-shaped channel 24 emerges inside an annular recess 29, which has its concavity directed towards the bent edge 21, and which is delimited between the screen 11 and the lip 12. The lip 12 is the first radially outermost lip, i.e. lip furthest from the axis A, of the annular gasket 9 and extends obliquely with respect to the flange portion 16 in a direction away from the sleeve portion 15 so as to cooperate with the first flange portion 16 with which it therefore defines a second labyrinth seal 30.

The first flange portion 16 may have an intermediate right-angled bend 31 defining, in radial cross-section, an L situated on the opposite side to the L defined by the edge 21 bent preferably at right angles; the bend 31 is arranged at the outlet inside the annular recess 29 of the constant-width L-shaped channel 24, and extends axially projecting above the concavity of the annular recess 29 so as to form a drip guide designed during use to guide any external contaminants which pass through the first labyrinth seal 22 inside the said annular recess 29.

The first flange portion 16 terminates on the side of the sleeve portion 15 with a second annular section 32, which is arranged obliquely with respect to the sleeve portion 15. The sleeve portions extends axially from the part of the first annular section or edge 21 folded at right angles, so as to delimit on the opposite side to the sleeve portion 15 a cavity 33 with a frustoconical shape, which is filled during use with a water-repellent substance 34.

A third annular section 35 of the first flange portion 16 is arranged between the second annular 32 section and the preferably right-angled intermediate bend 31, and is formed as a flat annular section designed during use to come into contact against an axial shoulder 36 of the rotating element 4 (in the example shown, defined by part of the flanged end 5) and is designed in turn to act as an assembly shoulder for embedding the screen 10 on a radially outer, cylindrical, side surface 37 of the rotating element defined by the inner ring 4.

Basically, the first flange portion 16 is shaped so as to extend away from the sleeve portion 15 in both an axial direction (optional as for the example shown), and radial direction with the annular section. The first flange portion 16 then continues perpendicularly with respect to the sleeve portion 15, away therefrom only in the radial direction, with the annular section 35, moves back again towards the sleeve portion 15 by means of the bend 31, then moves away only in the radial direction from the sleeve portion 15, extending parallel to the annular section 35 and terminates in the right-angled bent edge 21, which extends parallel to the sleeve portion 15 and in a position facing the sleeve portion 15.

The lip 13 is the second lip, proceeding in the radial direction, of the annular gasket 9 and, according to the example embodiments, cooperates by means of sliding contact in a fluid-tight manner with the annular section, which defines towards the lip 13 and the screen 11, a conical sealing surface 38 having its conicity directed towards the screen 11, which converges towards the axis A on the side where the screen 11 is situated.

In FIG. 1, the lip 13 is shown out of scale for better understanding and partially hatched, in an un-deformed configuration.

The sealing assembly 1 further comprises an annular groove 39, which is provided on the stationary element 3. The annular groove 39 is formed in the side surface 23, generally with a cylindrical shape, of the stationary element or outer ring 3, in the position adjacent to the right-angled bent edge 21 and is delimited, in the axial direction, by a curved section 40 along which the groove 39 deepens in the direction towards the rotating element 4 and the axis A and, immediately in sequence, by a straight section 41 defining an inclined surface along which the depth of the groove 39 decreases down to zero.

The annular groove 39 is formed so that the curved section 40 has its concavity directed towards the side where any external contaminants may arrive during use, indicated schematically by means of an arrow K. The concavity of the curved section 40 is preferably directed on the opposite side to the rotating element 4, as indicated by means of a continuous line in FIG. 1. The groove 39 may, however, have a different form, in particular if the expected direction of arrival of the contaminants is different, as shown in broken lines in FIG. 1.

The third lip 14 of the annular gasket 9 is a so-called grease stop lip, which extends obliquely towards the sleeve portion 15. The lip 14 cooperates preferably without sliding contact with the sleeve portion 15 in order to form a seal 43. The grease stop lip 14 may, however, also be designed so as to make sliding contact on the sleeve portion 15.

The sleeve portions 15 and 18 are delimited by respective cylindrical mating surfaces 44 and 45, respectively, which are formed during use on the rotating element 4 and on the stationary element 3. The sleeve portion 18 is lined with elastomeric material. A suitable quantity of water-repellent substance is applied onto the surface 44, along the second annular section 32 of the flange portion 16, in order to increase the sealing action.

Figure 2A:
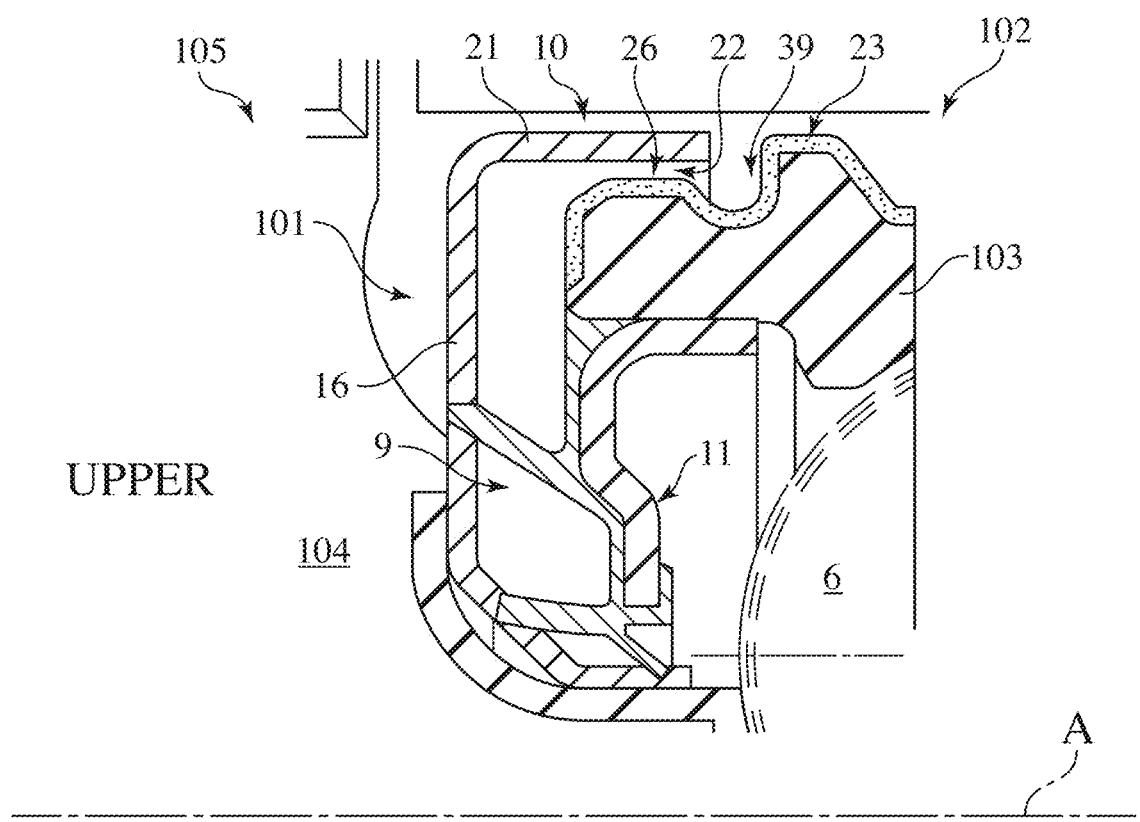
FIGS. 2A-B show, in schematic form and radially sectioned, a first example embodiment applied to the wheel hub unit according to FIG. 1.
Figure 2B:
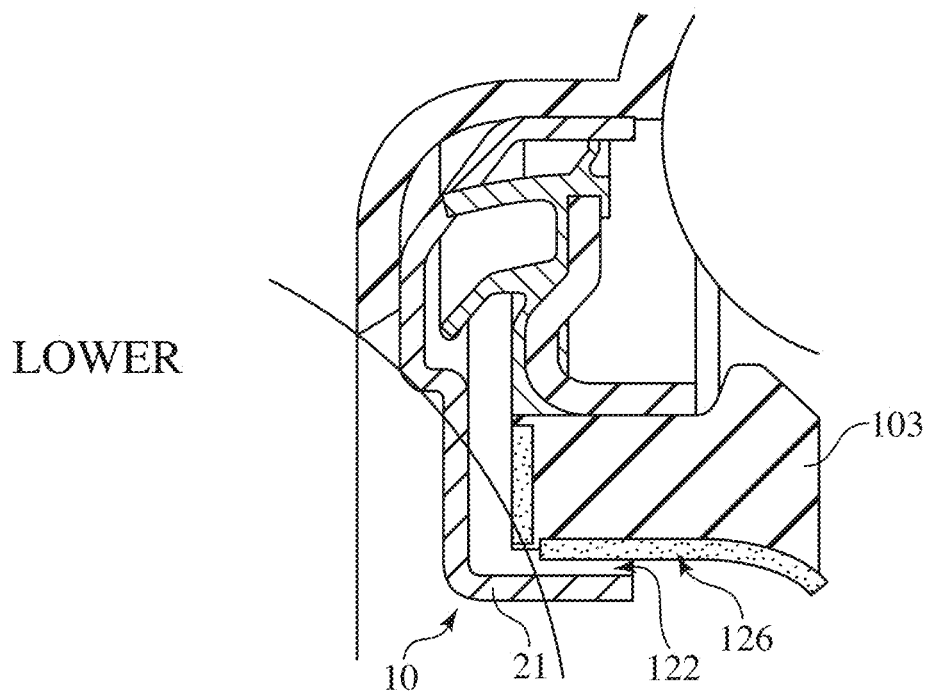

With reference to FIGS. 2A-B, a wheel hub unit 102 is equipped with a sealing assembly 101 similar to the sealing assembly 1 described above in reference to FIG. 1. Therefore, details similar to or the same as those already described will not be further explained and for them reference may be made to FIG. 1 for all the reference numbers. For the sake of easier illustration, FIGS. 2A-B comprises two details, one (UPPER) relating to the upper portion of the wheel hub unit 102, as noted by FIG. 2A, and the one (LOWER) relating to the lower portion of the same unit, as noted by FIG. 2B.

The wheel hub unit 102 comprises an outer ring 103, which is stationary during use, an inner ring 104, rotating during use about an axis A, which is also the axis of symmetry of both the rings 103 and 104, and at least one row of rolling elements 6 interposed between the outer ring 103 and the inner ring 104, which are coaxial with each other.

In particular, the sealing assembly 101 comprises a screen 11, which is stationary during use and has an annular gasket 9, and a screen 10, which is rotating during use, these being more or less identical to those of the sealing assembly 1. In this configuration also the flange portion 16 terminates in a bent edge 21 at right angles, which defines with the stationary element 103 the first labyrinth seal 22. With reference to the upper portion (UPPER), FIG. 2A, the stationary element, namely the radially outer ring 103 is made with the same previous profiling described for the outer ring 3. In particular, it is possible to identify the side surface 23 which, as described above, comprises the cylindrical section 26 and the annular groove 39. This external shaping of the radially outer ring 103 is essentially a deflector, which prevents the contaminating elements from entering directly inside the bearing, deviating the flow thereof towards the flanged end 105 of the radially inner ring 104, which is rotating during use.

According to the example embodiments, with reference to the lower portion (LOWER), FIG. 2B, of the wheel hub unit 102, the interruption of the angular shielding on the lower side of the wheel hub unit is defined by a flattening 126 of the first cylindrical section 26 (as visible in the UPPER portion, FIG. 2A), with a depth such as to eliminate practically all of the annular groove 39 in the side surface 23 (again visible in the UPPER portion, FIG. 2A) of the stationary element 103. In this way, the width of the lower portion 122 of the labyrinth seal, in the lower part of the wheel hub unit, will be greater than the width of the upper portion 22 of the labyrinth seal, in the upper part of the wheel hub unit, facilitating gravity drainage of water, sludge and contaminants in general.

Figure 3A:
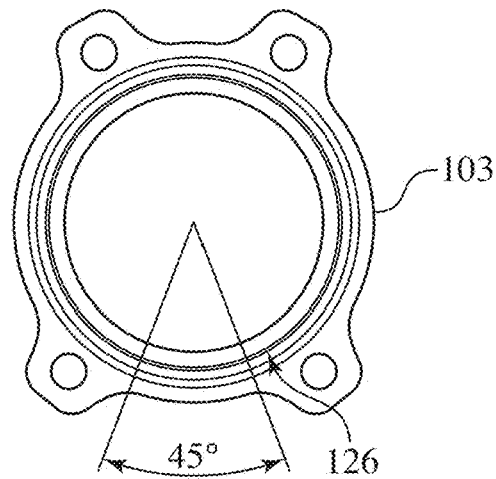
FIGS. 3A-C shows, in schematic form, a front view of three possible solutions of the example embodiment shown in FIGS. 2A-B.
Figure 3B:
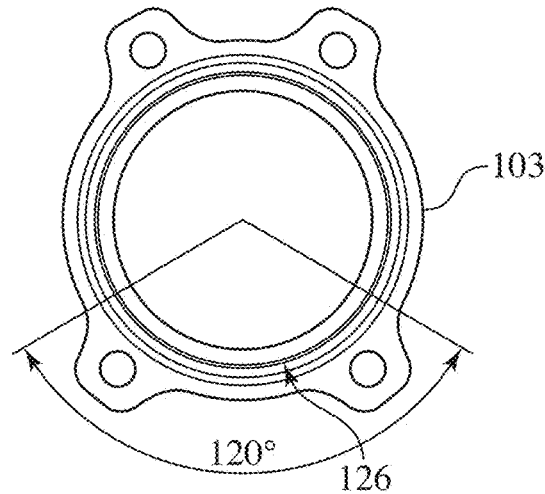
Figure 3C:
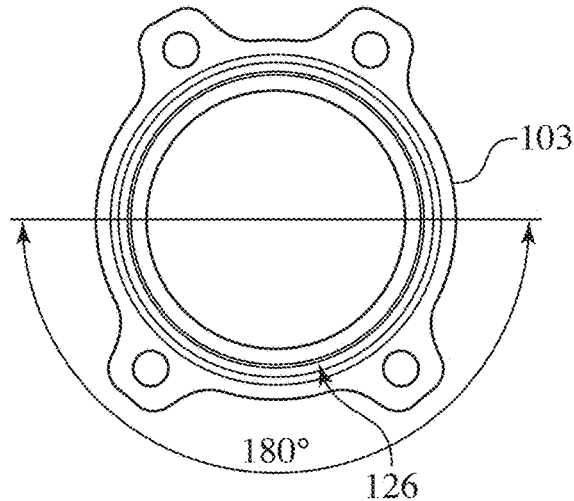

With reference to FIG. 3, the flattening 126 may assume different angular widths depending on the specific operating conditions of the wheel hub unit 102. In particular, it is necessary to consider the trade-off consisting in: a) limiting the entry of contaminants and b) allowing the evacuation thereof. According to the first aspect, the angular interruption of the shielding must have the smallest possible width, in particular if the architecture of the vehicle on which the wheel hub unit 102 is mounted is such as to favour the entry of sludge and other contaminants not only from above, but also laterally. According to the other aspect, instead, it is clear that greater angular widths of the interruption in the shielding favour drainage of the contaminants. Preferably, for operating conditions where a low accumulation of contaminants is envisaged and therefore a smaller drainage capacity is required, the angular width may be of the order of, or approximately, 45° (FIG. 3a). Where, instead, more severe operating conditions are envisaged, this angular width may be of the order of, or approximately, 120° (FIG. 3b) or even as much as, about, or approximately, 180° (FIG. 3), therefore involving the entire bottom portion of the labyrinth seal and the wheel hub unit.

In this way it is possible to achieve better drainage in an area which is little exposed to the entry of contaminants, but which is instead useful for allowing, by means of simple gravity, discharging of the sludge. The overall design is such that the advantage of protection against the entry of the contaminants on the upper part and on the sides of the wheel hub unit is achieved in a balanced manner, while improving the drainage performance on the bottom side of the bearing. This maximizes the performance of the wheel hub unit provided with low-friction labyrinth seal assemblies in all operating conditions.

It is understood that the inventive concepts disclosed herein are not limited to the embodiments described and illustrated here, which are to be regarded as examples of embodiments of the low-friction sealing assembly, these being instead subject to further modifications with regard to the form and arrangement of parts as well as the constructional and assembly details.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation." Adjectives such as "known," "normal," "standard," and terms of similar meaning should not be construed as limiting the item described to a given time period or to an item available as of a given time, but instead should be read to encompass known, normal, or standard technologies that may be available or known now or at any time in the future;

and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

The object of the present application is to provide a wheel hub unit which does not have the drawbacks identified herein, and which may be provided with a low-friction sealing assembly such as that mentioned above or variants thereof, which have the common feature that they operate with a small amount of interference of the sliding-contact lips and that may be defined as being low-friction.

According to certain embodiments in accordance with this disclosure, a wheel hub unit comprising the characteristic features described in the attached claims is provided.

According to certain embodiments in accordance with this disclosure, a labyrinth seal assembly between the outer ring of the wheel hub unit, stationary during use, and the flange portion of the screen integral with the inner ring, rotating during use, of the wheel hub unit, or, according to a variant which is entirely similar and dual, a labyrinth seal assembly between the flanged end of the inner ring and a screen integral with the outer ring, is provided with an interruption of the shield on the lower side of the wheel hub unit so that gravity drainage of the sludge is facilitated. In particular, the labyrinth seal does not have a circumferential symmetry, but comprises an upper portion and a lower portion with respect to an axis of symmetry of the wheel hub unit and is provided with an angular interruption of the shield on its lower portion corresponding to the lower side of the wheel hub assembly so as to increase the outflow section thereof from the said labyrinth seal, facilitating the gravity drainage of contaminants present inside the sealing assembly.

The interruption of the shield may be performed on the fixed part of the bearing, for example on the radially outer ring. On this component, it is possible to form, for example, a discharge opening for allowing the outflow of the water, sludge and contaminants in general outside of the bearing unit. The outflow must occur by means of gravity; therefore this opening is arranged along the vertical on the bottom of the bearing and may extend to different degrees around the axis.

According to certain embodiments in accordance with this disclosure, a wheel hub unit comprises a radially outer ring configured to be stationary during use of the wheel hub unit; a radially inner ring configured to rotate during use of the wheel hub unit; a flanged end opposite to the radially outer ring; at least one row of rolling elements interposed between the radially outer ring and the radially inner ring; and a sealing assembly interposed between the radially outer ring and the radially inner ring, the sealing assembly defines a shield of at least one labyrinth seal. Wherein, the at least one labyrinth seal does not have a circumferential symmetry, the at least one labyrinth seal comprises an upper portion and a lower portion with respect to a symmetry axis (A) of the wheel hub unit, and the at least one seal comprises an angular interruption of the shield formed on the lower portion corresponding to a lower side of the wheel hub unit, the angular interruption of the shield is configured to increase an outflow section from the labyrinth seal itself in order to facilitate gravity drainage of contaminants present inside the sealing assembly.

According to certain embodiments in accordance with this disclosure, the sealing assembly comprises, a first screen with an annular gasket, the first screen is configured to be stationary during use of the wheel hub unit, and a second screen with a flange portion terminating in a right-angled bent edge, the second screen is configured to rotate during use of the wheel hub unit. And, the radially outer ring comprises a radially outer side surface, and the right-angled bent edge of the flange portion extends axially towards an annular groove formed on the radially outer surface of the radially outer ring, the right-angled bent edge extends between a first cylindrical section and a second cylindrical section adjacent to the first cylindrical section of the radially outer surface of the outer ring, and the right-angled bent edge comprises a diameter greater than a diameter of the first cylindrical section in order to define the upper portion of the labyrinth seal with the radially outer ring. Further, wherein, the right-angled bent edge of the flange portion extends axially towards an annular groove formed on the radially outer surface of the radially outer ring, the right-angled bent edge extends between a first cylindrical section and a second cylindrical section adjacent to the first cylindrical section of the radially outer surface of the outer ring, and the right-angled bent edge comprises a diameter greater than a diameter of the first cylindrical section in order to define the upper portion of the labyrinth seal with the radially outer ring.

Moreover, according to certain embodiments in accordance with this disclosure, the angular interruption of the shield on the lower portion of the labyrinth seal is defined by a flattening of the first cylindrical section, the angular interruption includes a depth such as to eliminate all of the annular groove of the lateral surface of the radially outer ring. Wherein, the radially outer ring comprises an angular width of about 45°, 120° or 180°. And, wherein the sealing assembly defines the shield of the at least one labyrinth seal by cooperating with the radially outer ring or with the radially inner ring.

These and other objects, features, and characteristics of the present disclosure, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

The invention claimed is:

1. A wheel hub unit, comprising:
   a radially outer ring comprising a radially outer surface, the radially outer surface comprising:
      an annular groove formed at a top portion of the radially outer ring; and
      a flattening portion formed at a bottom portion of the radially outer ring axially opposite the top portion of the radially outer ring;
   wherein the radially outer ring is configured to be stationary during use of the wheel hub unit;
   a radially inner ring, wherein the radially inner ring is configured to rotate during use of the wheel hub unit;
   a flanged end opposite to the radially outer ring;
   at least one row of rolling elements interposed between the radially outer ring and the radially inner ring; and
   a sealing assembly interposed between the radially outer ring and the radially inner ring, the sealing assembly comprising:
      a first annular screen comprising an annular gasket, wherein the first annular screen is fixed to the radially outer ring;
      a second annular screen fixed to the radially inner ring, the second annular screen comprising:
         a flange portion comprising a radially outer distal end;
         a bent edge portion extending axially from the radially outer distal end of the flange portion, wherein the second screen is fixed to the radially inner ring; and
         an angular interruption at a lower portion of the second annular screen;
      a labyrinth seal defined by the bent edge portion and the radially outer surface of the radially outer ring, the labyrinth seal comprising:
         an upper portion formed between the bent edge and the top portion of the radially outer ring; and
         a lower portion axially opposite the upper portion,
      wherein the labyrinth seal is circumferentially asymmetric, and
      wherein the angular interruption of the second annular screen and the flattening portion of the radially outer surface of the radially outer ring coincide with one another during use of the wheel hub unit.

2. The wheel hub unit of claim 1, wherein the radially outer ring comprises an angular width of about 45°, 120° or 180°.

3. The wheel hub unit of claim 1, wherein the sealing assembly defines the second annular screen of the at least one labyrinth seal by cooperating with the radially outer ring or with the radially inner ring.

4. A sealing assembly for sealing a gap between a radially outer ring and a radially inner ring, comprising:
   a first screen with an annular gasket, the first screen configured to be stationary during use of a wheel hub unit in which the sealing assembly is to be installed, the wheel hub unit having a radially outer ring comprises a radially outer side surface, and
   a second screen with a flange portion terminating in a right-angled bent edge, the second screen configured to rotate during such use of the wheel hub unit;
   at least one circumferentially asymmetric labyrinth seal disposed between at least a portion of the first screen and at least a portion of the second screen and having an upper portion and a lower portion with respect to a symmetry axis (A); and
   an angular interruption defined by at least one circumferentially asymmetric labyrinth seal on a first portion corresponding to a first side of the sealing assembly,
   wherein the right-angled bent edge of the flange portion extends axially towards an annular groove formed on the radially outer surface of the radially outer ring, the right-angled bent edge extends between a first cylindrical section and a second cylindrical section adjacent to the first cylindrical section of the radially outer surface of the outer ring, and the right-angled bent edge comprises a diameter greater than a diameter of the first cylindrical section in order to define an upper portion of the at least one circumferentially asymmetric labyrinth seal with the radially outer ring, wherein the angular interruption of the shield on the lower portion of the labyrinth seal is defined by a flattening of the first cylindrical section, the angular interruption includes a depth such as to eliminate all of the annular groove of the lateral surface of the radially outer ring, wherein the radially outer ring comprises an angular width of about 45°, 120° or 180°.

5. The wheel hub unit of claim 1, wherein the radially inner ring comprises the flanged end.

6. The wheel hub unit of claim 1, wherein the annular gasket of the first annular screen comprises a plurality of sealing lips.

7. The wheel hub unit of claim 6, wherein the plurality of sealing lips comprises:
   a first sealing lip extending axially from the first annular screen toward the second annular screen and radially outward;
   a second sealing lip extending axially from the first annular screen toward a second annular section of the second annular screen, wherein the second annular section is formed at an oblique angle with respect to the bent edge of the second annular screen.

8. The wheel hub unit of claim 7, wherein the plurality of sealing lips further comprises a third sealing lip extending radially and axially inward.

9. The wheel hub unit of claim 1, wherein the annular groove comprises:
   an axially inner curved section, wherein the curved section comprises a concavity configured to direct external contaminants away from an interior of the sealing assembly; and
   an axially outer straight section.

10. The sealing assembly of claim 4, wherein the first annular screen further comprises a plurality of sealing lips.

11. The sealing assembly of claim 4, wherein the plurality of sealing lips comprises:
   a first sealing lip extending axially from the first annular screen toward the second annular screen and radially outward;
   a second sealing lip extending axially from the first annular screen toward a second annular section of the second annular screen, wherein the second annular section is formed at an oblique angle with respect to the bent edge of the second annular screen.

12. The sealing assembly of claim 11, wherein the plurality of sealing lips further comprises a third sealing lip extending radially and axially inward.

* * * * *